United States Patent
Haimer

(10) Patent No.: US 9,636,788 B2
(45) Date of Patent: May 2, 2017

(54) APPARATUS FOR COOLING A SHRINK-FIT CHUCK

(71) Applicant: FRANZ HAIMER MASCHINENBAU KG, Hollenbach (DE)

(72) Inventor: Franz Haimer, Hollenbach (DE)

(73) Assignee: Franz Haimer Maschinenbau KG, Hollenbach (DE)

( * ) Notice: Subject to any disclaimer, the term of this patent is extended or adjusted under 35 U.S.C. 154(b) by 213 days.

(21) Appl. No.: 14/378,260

(22) PCT Filed: Feb. 12, 2013

(86) PCT No.: PCT/EP2013/052729
§ 371 (c)(1),
(2) Date: Aug. 12, 2014

(87) PCT Pub. No.: WO2013/120821
PCT Pub. Date: Aug. 22, 2013

(65) Prior Publication Data
US 2015/0000121 A1    Jan. 1, 2015

(30) Foreign Application Priority Data

Feb. 13, 2012    (DE) .................. 10 2012 002 596

(51) Int. Cl.
*B23P 11/02*    (2006.01)
*H05B 6/10*    (2006.01)
(Continued)

(52) U.S. Cl.
CPC ............ *B23P 11/027* (2013.01); *H05B 6/101* (2013.01); *H05B 6/14* (2013.01); *H05B 6/40* (2013.01); *Y10T 29/53439* (2015.01)

(58) Field of Classification Search
CPC  B23P 11/027; H05B 6/14; H05B 6/40; H05B 6/101; Y10T 29/53439
See application file for complete search history.

(56) References Cited

U.S. PATENT DOCUMENTS 6,861,625 B1 *   3/2005   Haimer .............. B23B 31/1179
                                                219/221
8,373,104 B2     2/2013   Haimer
(Continued)

FOREIGN PATENT DOCUMENTS

DE    20 2006 002 270 U1    2/2006
DE       102007044097 A1    3/2009
(Continued)

OTHER PUBLICATIONS

Written Opinion (WO) published Aug. 13, 2014 for International Patent Application No. PCT/EP2013/052729 filed on Feb. 12, 2013.
(Continued)

*Primary Examiner* — Emmanuel Duke
(74) *Attorney, Agent, or Firm* — Paul D. Bianco; Gary S. Winer; Fleit Gibbons Gutman Bongini & Bianco PL

(57)    ABSTRACT

An apparatus for cooling a shrink-fit chuck, having a cooling attachment that can be placed on the shrink-fit chuck and contains a plurality of feed openings for supplying a coolant into an interior of the cooling attachment. Connected to the cooling attachment are a device for feeding a liquid coolant into the interior of the cooling attachment and a suction-extraction device for the suction-extraction of the liquid coolant used for cooling the shrink-fit chuck from the interior of the cooling attachment.

16 Claims, 5 Drawing Sheets

(51) Int. Cl.
*H05B 6/40* (2006.01)
*H05B 6/14* (2006.01)

(56) References Cited

U.S. PATENT DOCUMENTS

| | | | |
|---|---|---|---|
| 2005/0204552 A1* | 9/2005 | Steudte | B23B 31/1179 29/800 |
| 2006/0163245 A1* | 7/2006 | Pfau | B23P 11/027 219/635 |
| 2009/0302062 A1* | 12/2009 | Maddy | B05B 11/0054 222/183 |
| 2010/0133262 A1* | 6/2010 | Haimer | B23P 11/027 219/635 |
| 2010/0200571 A1 | 8/2010 | Haimer | |
| 2012/0186286 A1 | 7/2012 | Haimer | |

FOREIGN PATENT DOCUMENTS

| | | | | |
|---|---|---|---|---|
| DE | 102009017461 A1 * | 10/2010 | | B23P 11/027 |
| DE | 10 2009 034 730 | 1/2011 | | |
| DE | 102010033160 A1 * | 2/2012 | | B23P 11/027 |
| WO | 2004043643 A1 | 5/2004 | | |
| WO | 2007028522 A2 | 3/2007 | | |
| WO | WO 2007028522 A2 * | 3/2007 | | B23P 11/02 |
| WO | 2008098752 A2 | 8/2008 | | |
| WO | 2008145234 A1 | 12/2008 | | |

OTHER PUBLICATIONS

English Translation of Written Opinion (WO) published Aug. 13, 2014 for International Patent Application No. PCT/EP2013/052729 filed on Feb. 12, 2013.
Written Opinion, Aug. 13, 2014 for PCT/EP2013/052729, filed Feb. 12, 2013.
International Preliminary Report on Patentability dated Aug. 19, 2014 for PCT/EP2013/052729, filed Feb. 12, 2013.
German First Examination Report dated Feb. 9, 2015 for Application No. 10 2012 002 596.3.
International Search Report for PCT/EP2013/052729 dated Mar. 20, 2013.

* cited by examiner

A-A

B-B

APPARATUS FOR COOLING A SHRINK-FIT CHUCK

FIELD OF THE INVENTION

The invention relates to an apparatus for cooling a shrink-fit chuck.

BACKGROUND OF THE INVENTION

Such an apparatus is known from DE 10 2009 017 461 A1. The apparatus disclosed there contains a cooling attachment which is guided movably on a guide rail and is used for receiving a shrink-fit chuck previously heated for thermal shrink-fitting or releasing of a machine tool. The cooling attachment is designed such that it surrounds the shrink-fit chuck, delimiting an annular channel wherein multiple blowing nozzles issue into the annular channel for blowing out compressed air as a coolant. Therefore the cooling of the shrink-fit chuck in this known apparatus is achieved with compressed air. The cooling power when cooling by compressed air is limited, however.

Apparatuses are already known in which the cooling is accomplished with a liquid coolant. An apparatus is known from WO 2007/028522 A2, for example, in which the shrink-fit chuck is sprayed with liquid coolant via a coolant nozzle. For cooling in this case, a pot-like container is slipped over the shrink-fit chuck and the coolant nozzle to prevent the sprayed coolant from escaping to the outside. The sprayed coolant prevented from escaping to the outside by the container must be captured in a collection basin underneath the shrink-fit chuck or fed back to the coolant circuit via a closed circuit. An additional apparatus is also necessary for blowing the coolant remaining after cooling off the shrink-fit chuck. A considerable engineering effort is required here for the shielding, collecting of the coolant and subsequent drying, however.

SUMMARY OF THE INVENTION

An apparatus of the type mentioned above which enables efficient and fast cooling of various shrink-fit chucks in a simple and cost-effective manner is disclosed.

Expedient improvements and advantageous embodiments of the invention are also disclosed.

In the apparatus according to the invention, a device for supplying a liquid coolant to the interior of the cooling attachment via the one or more feed openings and a suction-extraction device for suction-extracting the liquid coolant used for cooling the shrink-fit chuck from the interior of the coolant adapter are connected to the cooling attachment. The suction-extraction device contains at least one suction-extraction line connected to a suction-extraction unit, air at the underside of the cooling attachment being suctioned in by the suction unit via the suction-extraction line. The suctioned air takes up the liquid coolant and transports it to a collecting container. The liquid coolant, by which a particularly effective and fast cooling of the shrink-fit chuck can be achieved, is suction-extracted inside the cooling attachment, so that the shrink-fit chuck is dry after cooling and no elaborate coolant capture devices underneath the cooling attachment are required. Due to the suction-extraction of the coolant, a relatively large gap can be present between the inner wall of the cooling attachment and the outer wall of the shrink-fit chuck, so that a single cooling attachment can be used for multiple different shrink-fit chucks with a large diameter range.

The device for feeding the liquid coolant expediently has a coolant pump and a coolant connector on the cooling attachment, which is connected to the coolant pump to supply the liquid coolant to the feed openings. For example, the feed openings can be connected via cooling bores to an annular space, the annular space being advantageously situated between an outer sleeve and an inner sleeve of the cooling attachment and the cooling bores as well as the feed openings being arranged in the inner sleeve.

The suction-extraction device contains a suction-extraction line that is arranged on the upper side of the cooling attachment and is connected to at least one suction-extraction unit. By means of the suction-extraction device, an upward-directed air stream can thus be produced inside the cooling attachment, by which the coolant is suction-extracted upwards and the coolant can be prevented from flowing downwards. The cooling bores inside the cooling attachment can also run at an angle upwards in the direction of the upper side of the cooling attachment, so that the coolant strikes the shrink-fit chuck at an angle upward in the suction-extraction direction and thereby the suction extraction is supported.

In an additional advantageous embodiment, at least one cutout can be provided in the outer sleeve, through which the inner sleeve, preferably consisting of a transparent material, is visible. Thereby the cooling of the shrink-fit chuck can be monitored from the outside. Markings can also be applied to the inner sleeve in the area of the cutouts, in order to offer the possibility of axially positioning the cooling attachment. A mechanical stop can also be provided in the interior for axially positioning the cooling attachment, so that the cooling attachment is seated on the shrink-fit chuck.

For easy operation of the apparatus and for automating the cooling process, the cooling attachment can be mounted so as to be movable vertically on a guide part. The cooling attachment can expediently be lowered onto a holder for receiving the shrink-fit chuck, a lower base area for exact positioning of the holder being provided on the guide part underneath the cooling attachment. The apparatus is not only operable in the vertical orientation, however; it can also be used horizontally and in other desired directions.

In another advantageous embodiment, an induction device can be integrated in the cooling attachment. Thereby the cooling attachment can be used not only for cooling but also for shrink-fitting.

BRIEF DESCRIPTION OF THE DRAWINGS

Additional details and advantages of the invention emerge from the following description of a preferred embodiment with reference to the drawings. In the drawing.

DETAILED DESCRIPTION OF THE INVENTION

Figure 1:
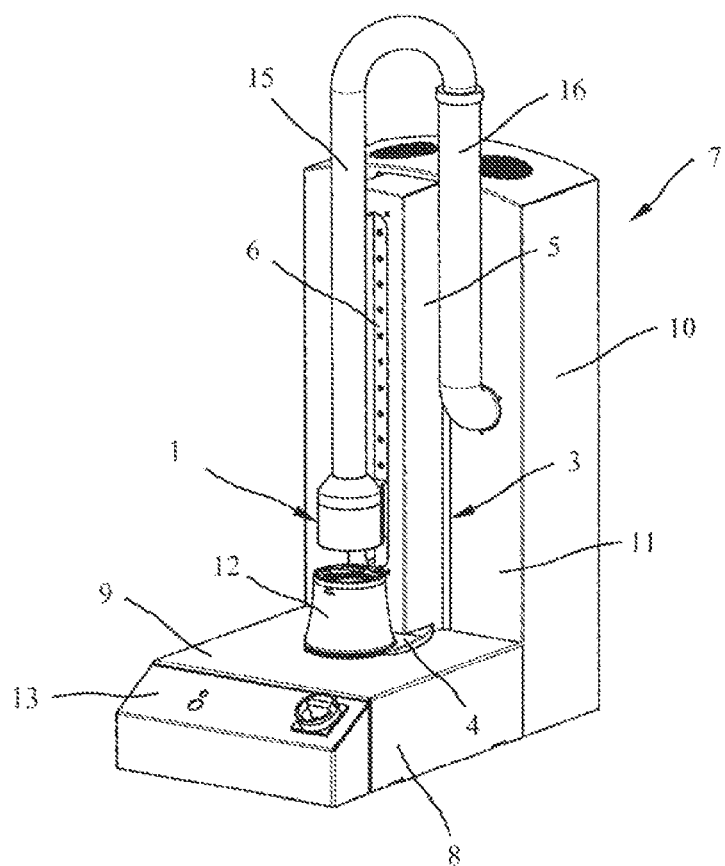
FIG. 1 shows a schematic representation of an apparatus for cooling a shrink-fit chuck in a perspective view.
Figure 2:
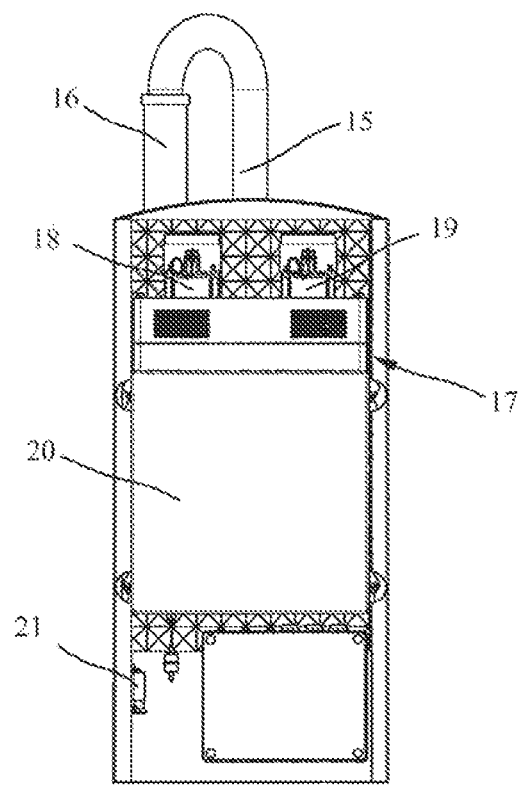
FIG. 2 shows the apparatus shown in FIG. 1 in a rear view.
Figure 3:
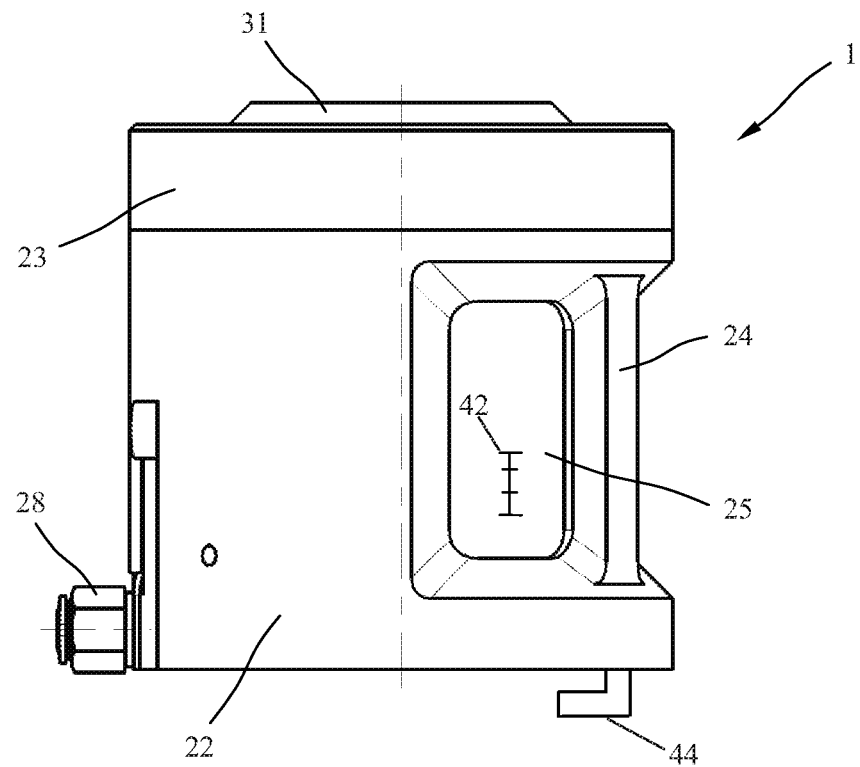
FIG. 3 shows a cooling attachment in a side view.
Figure 4:
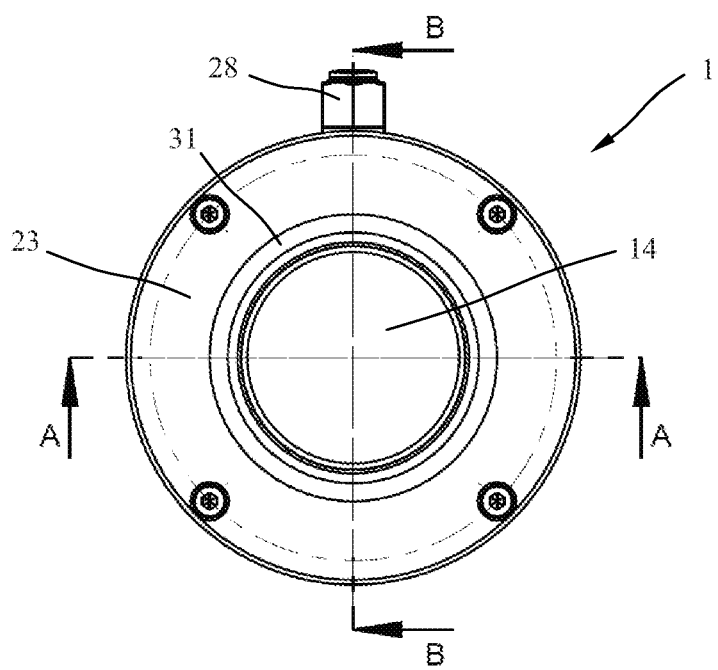
FIG. 4 shows the cooling attachment of FIG. 3 in a plan view.
Figure 5:
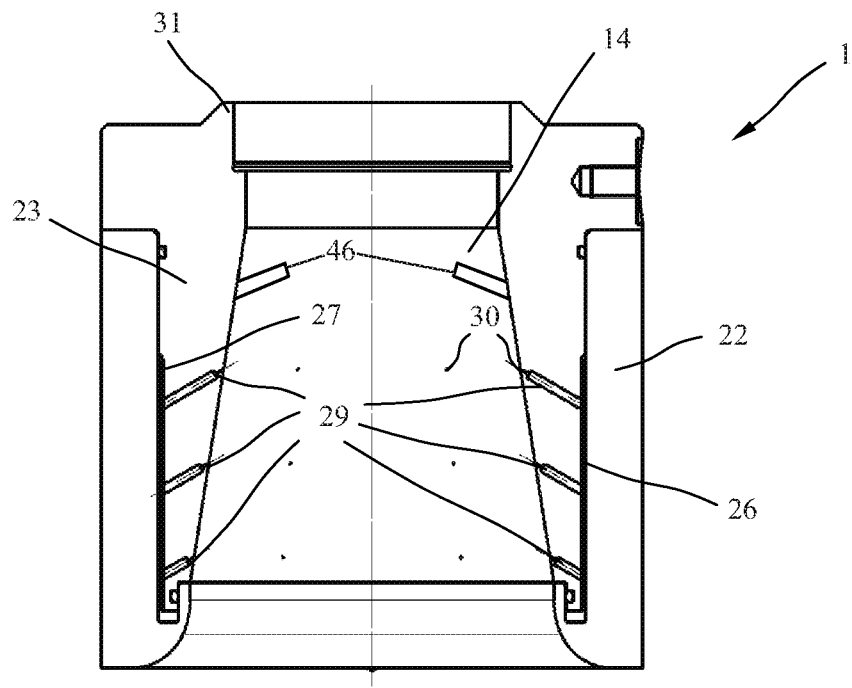
FIG. 5 shows a sectional view along the line A-A of FIG. 4.
Figure 6:
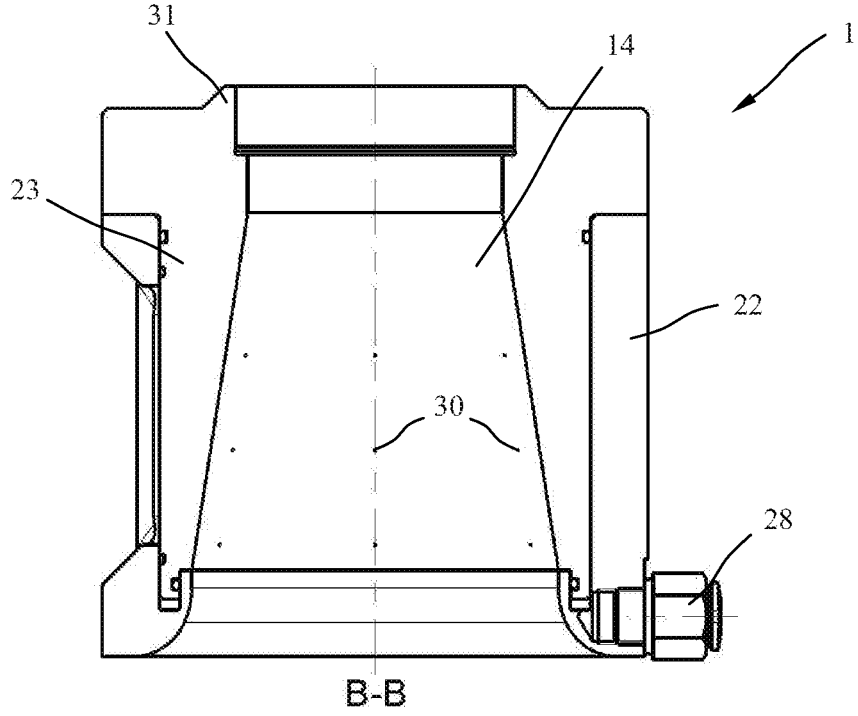
FIG. 6 shows a sectional view along the line B-B of FIG. 4.
Figure 7:
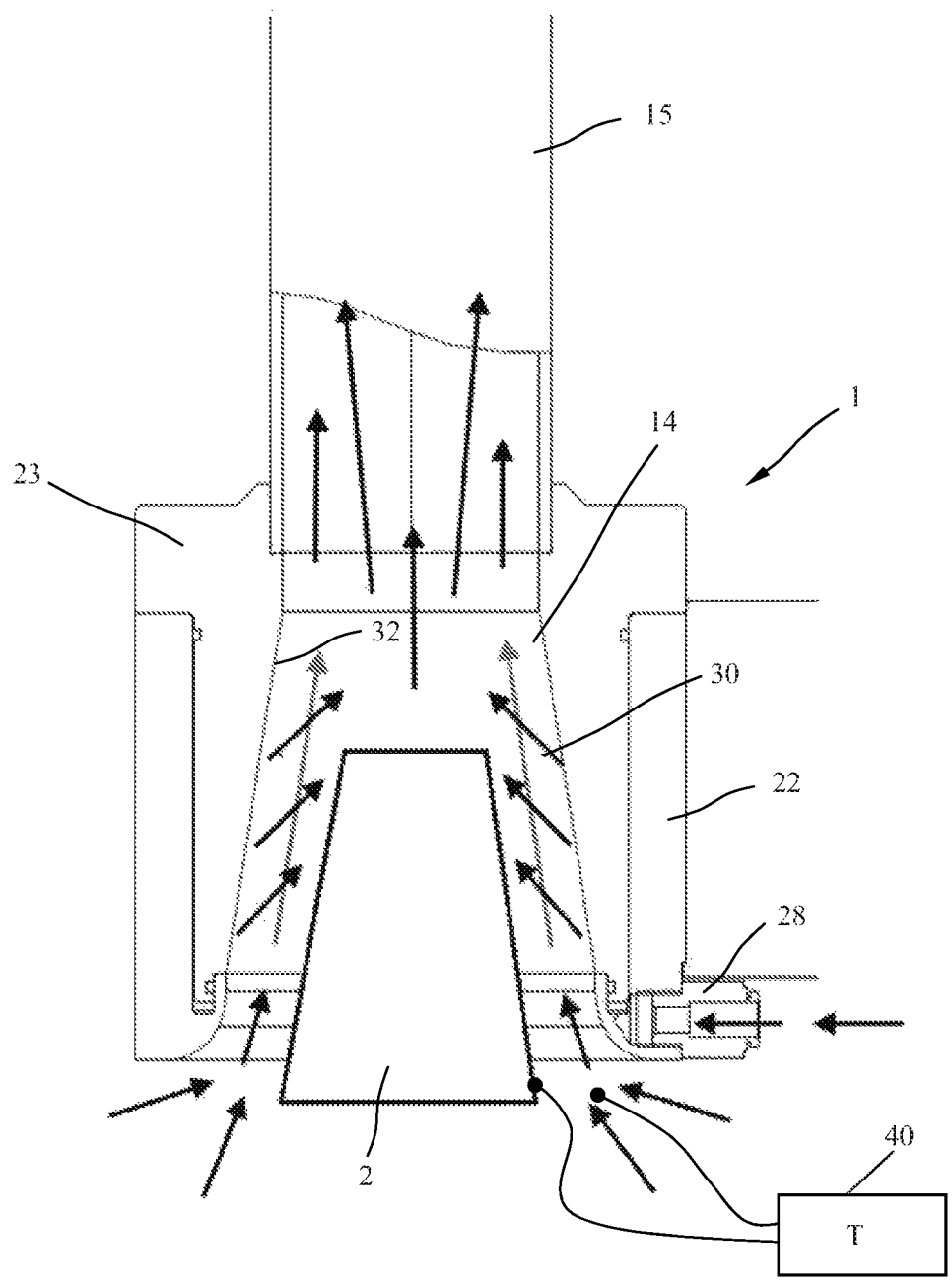
FIG. 7 shows a schematic representation of the cooling attachment in order to explain the mode of operation.

The apparatus for cooling a shrink-fit chuck shown schematically in FIGS. 1 and 2 contains a cooling attachment 1 shown separately in FIGS. 3-5, which can be placed on the shrink-fit chuck 2 shown schematically in FIG. 7. Such an apparatus is used to cool a shrink-fit chuck 2 after it has been heated for shrink-fitting a tool or removing a shrink-fit tool.

In the embodiment shown in FIG. 1, the cooling attachment 1 is guided so as to be movable vertically on a stanchion-like guide part 3. The guide part 3 contains a lower base area 4 and a vertically running upper guide area 5, in which a guide rail 6 for linear guidance of the cooling attachment 1 is accommodated. The guide part 3 in the embodiment shown is arranged on a housing 7. The housing 7, L-shaped in this case, has a front support part 8 with a horizontal support surface 9 and a rear housing part 10 with a vertical front wall surface 11. The guide part 3 rests with its lower base region 4 on the horizontal support surface 9 of the front support part 8. The vertically running guide area 5 of the guide part 3 is mounted on the vertical front wall surface 11 of the rear housing part 10.

The lower base region 4 of the guide part 3 is designed in the manner of a half shell-like receptacle for positionally exact contact with a holder 12 for receiving the shrink-fit chuck 2. Due to the contact of the holder 12 in the half shell-like base region 4, the shrink-fit chuck 2 received in the holder 12 can be arranged precisely underneath the cooling attachment 1, so that the cooling attachment 1 and the shrink-fit chuck are axially aligned with one another. An operating console 13, on which a number of operating elements for controlling and operating the cooling apparatus are arranged, is situated at the front support part 8 of the housing 7.

One end of a suction-extraction line 15, constructed as a flexible hose or a stable pipe for example, is arranged on the upper side of the cooling attachment 1, provided according to FIGS. 4-7 with a continuous interior 14. The other end of the suction-extraction line 15 is connected to a tubular suction-extraction connector 16, which leads to a suction-extraction unit 17 shown in FIG. 2. The suction-extraction connector 16 is mounted alongside the guide part 3 on the vertical front wall surface 11 of the rear housing part 10. Together with the suction extraction connector 16 and the suction-extraction line 15, the suction-extraction unit 17 forms a suction-extraction device, via which the liquid coolant sprayed onto the shrink-fit chuck 2 inside the cooling attachment 1 can be suction-extracted and transported to a collecting container.

As can be seen from FIG. 2, the suction-extraction unit 17 is accommodated in the rear housing part 10. In the embodiment shown, the suction-extraction unit 17 has two separate motors 18 and 19 and a collecting container 20 for collecting the coolant extracted from the cooling attachment 1. Additional supply devices and a coolant pump 21 for feeding the liquid coolant to the cooling attachment 1 can also be arranged in the rear housing part 10.

The cooling attachment 1, shown in different views in FIGS. 3-6, consists of an outer sleeve 22 and an inner sleeve 23 with a continuous interior 14 arranged inside the outer sleeve 22. According to FIG. 3, three cutouts 25 separated by webs 24 from one another are provided in the outer sleeve 22, through which cutouts the inner sleeve 23 consisting preferably of a transparent material is visible. Thereby the cooling of the shrink-fit chuck can be monitored from the outside. The transparent inner sleeve 23 can also be illuminated with an LED in color (red/green), in order to indicate insufficient cooling or sufficient cooling by different colors for example. The apparatus can also have devices 40 (FIG. 7) for measuring the temperature of the shrink-fit chuck 2 and/or for measuring the temperature of the air stream. These devices 40 can be arranged on the cooling attachment 1 or on other suitable components.

As can be seen from FIG. 5, an annular space 26 is provided between the outer sleeve 22 and the inner sleeve 23. In the embodiment shown, the annular space 26 is formed by a continuous recess 27 on the outer side of the inner sleeve 23. The annular space 26 can also be formed in a corresponding manner by a continuous recess on the inner side of the outer sleeve 22 however. Liquid coolant can be delivered to the annular space 26 via a coolant connector 28 on the outer sleeve 22. The coolant pump 21 can be connected for this purpose to the coolant connector 28 via suitable lines. A plurality of cooling bores 29, which lead from the annular space 26 at an angle upwards to the interior 14 and issue into the interior 14 through feed openings 30, are situated in the inner sleeve 23. The coolant delivered by the coolant pump 21 via a corresponding line and the coolant connector 28 to the annular space 26 can thus be sprayed via the cooling bores 29 onto the outer side of a shrink-fit chuck. The interior 14 of the inner sleeve 23 has a cross section tapering upwards in order to generate a good suction effect. A connector 31 for the suction-extraction line 15 is provided at the upper end of the inner sleeve.

The mode of operation of the above-described apparatus will be explained below with reference to FIG. 7.

The cooling attachment 1 is placed on the shrink-fit chuck 2 that is to be cooled in such a manner that a sufficiently large gap for drawing in air remains between an inner wall 32 of the inner ring 22 and the outer wall of the shrink-fit chuck 2. Markings 42 can also be applied to the inner sleeve 23 in the area of the cutouts 25, in order to offer the possibility of axially positioning the cooling attachment 1. A mechanical stop 44 can also be provided in the interior 14 for axially positioning the cooling attachment 1, so that the cooling attachment is seated on the shrink-fit chuck 2. Water or some other liquid coolant is then supplied to the cooling attachment 1 via the coolant connector 28. This coolant is sprayed via the feed openings 30 onto the shrink-fit chuck 2. At the same time, air is drawn in at the underside of the cooling attachment 1 via the suction-extraction line 15 by the suction-extraction unit 17 shown in FIG. 2. The suctioned air entrains the coolant after spraying onto the shrink-fit chuck 2 and transports it to the collecting container 20 shown in FIG. 2. The suction-extraction process can be carried out somewhat longer than the actual cooling, so that all coolant is extracted and thus the shrink-fit chuck 2 can be removed as dry as possible after cooling. To improve the drying effect, air guiding elements 46 can be mounted in the interior 14, in order to draw the air stream onto concealed surfaces of the shrink-fit chuck.

Figure 8:
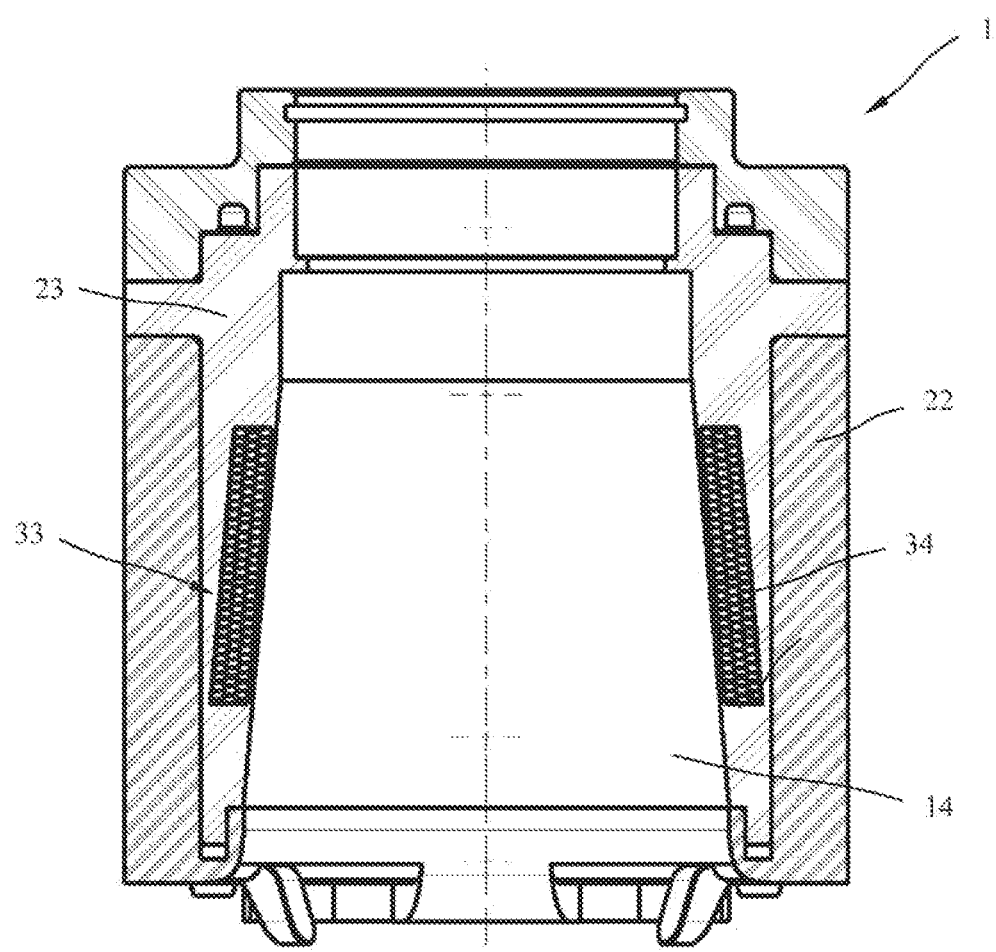
FIG. 8 shows an additional embodiment of a cooling attachment with integrated induction device.

FIG. 8 shows another embodiment of a cooling attachment 1 with an outer sleeve 22, an inner sleeve 23 arranged inside the outer sleeve 22 and a continuous interior 14. In this embodiment, an induction device 33 is integrated into the cooling attachment 1. A shrink-fit chuck 2 shown schematically in FIG. 7 can be heated with this induction device for introducing a tool to be shrink-fit. The cooling attachment 1 can thus be used not only for cooling but also for shrink-fitting. In the embodiment shown, the induction device 33 has an induction coil 34 arranged in the inner sleeve 23.

The invention claimed is:

1. An apparatus for cooling a shrink-fit chuck, the apparatus comprising:
    a cooling attachment positionable on the shrink-fit chuck and having a plurality of feed openings for feeding a coolant into an interior of the cooling attachment;
    a coolant feeder for feeding the coolant into the interior of the cooling attachment via the feed openings, the coolant feeder connected to the cooling attachment; and
    a suction-extraction device for extracting the coolant used for cooling the shrink-fit chuck from the interior of the cooling attachment, the suction-extraction device connected to the cooling attachment,
    wherein the suction-extraction device includes at least one suction-extraction line connected to a suction-extraction unit and air at an underside of the cooling attachment is suctioned in by the suction-extraction unit via the suction-extraction line and wherein the suctioning of air occurs at the same time as the feeding of the coolant.

2. The apparatus of claim 1, wherein the coolant feeder includes a coolant pump and a coolant connector on the cooling attachment and connected to the coolant pump for feeding the coolant to the feed openings.

3. The apparatus of claim 1, wherein the feed openings are connected to an annular space via cooling bores.

4. The apparatus of claim 3, wherein the annular space is situated between an outer sleeve and an inner sleeve of the cooling attachment and wherein the cooling bores and the feed openings are arranged in the inner sleeve.

5. The apparatus of claim 4, wherein the outer sleeve includes a cutout, through which the inner sleeve, preferably made of a transparent material, is visible.

6. The apparatus of claim 5, wherein markings for axial positioning of the cooling attachment on the chuck are provided on the inner sleeve in an area of the cutout.

7. The apparatus of claim 3, wherein the cooling bores run at an angle upwards in a direction of an upper side of the cooling attachment.

8. The apparatus of claim 1, wherein the suction-extraction line is on an upper side of the cooling attachment.

9. The apparatus of claim 8, wherein the cooling attachment includes a connector for the suction-extraction line on the upper side of the cooling attachment.

10. The apparatus of claim 1, wherein the cooling attachment is movable vertically on a guide part.

11. The apparatus of claim 10, wherein the cooling attachment can be lowered onto a holder for receiving the shrink-fit chuck.

12. The apparatus of claim 11, wherein the guide part contains a lower base area, configured and dimensioned for positioning of the holder underneath the cooling attachment.

13. The apparatus of claim 1, wherein the cooling attachment includes a mechanical stop for positioning the cooling attachment on the shrink-fit chuck.

14. The apparatus of claim 1, wherein the apparatus further comprises a temperature measuring device for measuring a temperature of the shrink-fit chuck or a device for measuring a temperature of an air stream.

15. The apparatus of claim 1, wherein an induction device is integrated into the cooling attachment.

16. An apparatus for cooling a shrink-fit chuck, the apparatus comprising: a cooling attachment positionable on the shrink-fit chuck and having a plurality of feed openings for feeding a coolant into an interior of the cooling attachment; a coolant feeder for feeding the coolant into the interior of the cooling attachment via the feed openings, the coolant feeder connected to the cooling attachment; and a suction-extraction device for extracting the coolant used for cooling the shrink-fit chuck from the interior of the cooling attachment, the suction-extraction device connected to the cooling attachment, wherein the suction-extraction device includes at least one suction-extraction line connected to a suction-extraction unit and air at an underside of the cooling attachment is suctioned in by the suction-extraction unit via the suction-extraction line and wherein the suctioning of air occurs at the same time as the feeding of the coolant; and wherein the cooling attachment includes air guiding elements for deflecting an air stream to concealed surfaces of the shrink-fit chuck.

* * * * *